US012771568B2

(12) United States Patent
Zhang

(10) Patent No.: US 12,771,568 B2
(45) Date of Patent: Oct. 20, 2026

(54) SMART HOME CONTROL METHOD, DEVICE, AND STORAGE MEDIUM

(71) Applicant: ZTE CORPORATION, Shenzhen (CN)

(72) Inventor: Wenyan Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 239 days.

(21) Appl. No.: 18/718,962

(22) PCT Filed: Oct. 31, 2022

(86) PCT No.: PCT/CN2022/128716
§ 371 (c)(1),
(2) Date: Jun. 12, 2024

(87) PCT Pub. No.: WO2023/109336
PCT Pub. Date: Jun. 22, 2023

(65) Prior Publication Data

US 2026/0156014 A1 Jun. 4, 2026

(30) Foreign Application Priority Data

Dec. 16, 2021 (CN) ........................ 202111540722.2

(51) Int. Cl.
*H04L 12/28* (2006.01)
*H04L 65/1016* (2022.01)

(52) U.S. Cl.
CPC ...... *H04L 12/2816* (2013.01); *H04L 65/1016* (2013.01)

(58) Field of Classification Search
CPC ........................ H04L 12/2816; H04L 65/1016
See application file for complete search history.

(56) References Cited

U.S. PATENT DOCUMENTS 10,086,782 B1 * 10/2018 Konrardy ............ H04L 12/2816
2014/0082702 A1 * 3/2014 Supalla .................. H04L 63/10 726/4

(Continued)

FOREIGN PATENT DOCUMENTS

CN 102546318 A 7/2012
CN 103067340 A 4/2013

(Continued)

OTHER PUBLICATIONS

European Patent Office. Extended European Search Report for EP Application No. 22906088.4, mailed Feb. 20, 2025, pp. 1-11.

(Continued)

*Primary Examiner* — Richard G Keehn
(74) *Attorney, Agent, or Firm* — Vivacqua Crane, PLLC

(57) ABSTRACT

The present application discloses a smart home control method, a device, and a storage medium. The method may include: sending a second operation instruction to a smart home control server, such that the smart home control server sends the second operation instruction to a smart home console and receives a second operation result fed back by the smart home console, wherein the second operation result is obtained through execution of the second operation instruction by a smart home device, and authorization for operating the smart home device has been obtained before the second operation instruction is sent; and receiving the second operation result fed back by the smart home control server.

20 Claims, 7 Drawing Sheets

(56) References Cited

U.S. PATENT DOCUMENTS

| | | | | |
|---|---|---|---|---|
| 2015/0058447 | A1* | 2/2015 | Albisu | H04L 12/2818 709/219 |
| 2015/0081904 | A1* | 3/2015 | Guedalia | H04L 41/28 709/225 |
| 2015/0156030 | A1* | 6/2015 | Fadell | H04L 12/2816 700/90 |
| 2015/0156031 | A1* | 6/2015 | Fadell | H04L 12/2816 700/90 |
| 2015/0370272 | A1* | 12/2015 | Reddy | H04L 12/2816 700/278 |
| 2016/0364114 | A1* | 12/2016 | Von Dehsen | H04L 12/2816 |
| 2017/0244574 | A1* | 8/2017 | Moon | H04L 12/2809 |
| 2017/0278380 | A1* | 9/2017 | Rabinovitch | H04L 12/2818 |
| 2017/0346649 | A1* | 11/2017 | Zhang | H04L 12/2818 |
| 2018/0006840 | A1* | 1/2018 | Su | H04L 12/2816 |
| 2018/0205788 | A1* | 7/2018 | Kim | H04L 12/281 |
| 2020/0112454 | A1* | 4/2020 | Brown | H04L 12/2816 |
| 2021/0116256 | A1* | 4/2021 | Konrardy | H04L 12/2816 |
| 2021/0142601 | A1* | 5/2021 | Schoenfelder | H04L 12/2807 |
| 2022/0294789 | A1* | 9/2022 | Tikhomirov | H04L 12/2816 |
| 2023/0179662 | A1* | 6/2023 | Kim | H04L 12/2816 709/230 |

FOREIGN PATENT DOCUMENTS

| | | | | |
|---|---|---|---|---|
| CN | 103580968 A | | 2/2014 | |
| CN | 105531971 A | | 4/2016 | |
| CN | 106657048 A | * | 5/2017 | H04L 12/2816 |
| CN | 107135069 A | | 9/2017 | |
| CN | 108257274 A | | 7/2018 | |
| CN | 113206816 A | | 8/2021 | |

OTHER PUBLICATIONS

International Searching Authority. International Search Report and Written Opinion for PCT Application No. PCT/CN2022/128716 and English translation, mailed Jan. 28, 2023, pp. 1-12.

* cited by examiner

SMART HOME CONTROL METHOD, DEVICE, AND STORAGE MEDIUM

CROSS-REFERENCE TO RELATED APPLICATION

This application is a national stage filing under 35 U.S.C. § 371 of international application number PCT/CN 2022/128716, filed Oct. 31, 2022, which claims priority to Chinese patent application No. 202111540722.2 filed Dec. 16, 2021, the contents of which are incorporated herein by reference in their entirety.

TECHNICAL FIELD

The present disclosure relates to the technical field of smart homes, in particular to a smart home control method and device and a storage medium.

BACKGROUND

With the development of Internet of Things (IoT), existing home appliances such as televisions, refrigerators, washing machines, or surveillance devices are transitioning towards smartification. Meanwhile, advancements in technologies like 5G networks and FTTH have enabled users to control their smart home devices via the network. However, while users control the smart home devices through a control terminal, such as a mobile phone or tablet computer, there are security risks in the data of the control terminal and the smart home devices.

SUMMARY

Embodiments of the present disclosure provide a smart home control method, a device and a storage medium.

An embodiment of the present disclosure provides a smart home control method, which may include: in response to receiving a first operation request sent by a smart home device service provider, sending verification information of the first operation request to a control terminal, such that the control terminal authenticates the verification information to obtain an authentication result and feeds back the authentication result; receiving the authentication result fed back by the control terminal, and sending a first operation instruction of the first operation request to a smart home console in response to a positive authentication result, such that the smart home console sends the first operation instruction to a smart home device; receiving a first operation result sent by the smart home console, and sending the first operation result to the smart home device service provider, where the first operation result is obtained through execution of the first operation instruction by the smart home device; in response to receiving a second operation instruction sent by the control terminal, sending the second operation instruction to the smart home console, such that the smart home console sends the second operation instruction to the smart home device, where the control terminal is authorized to operate the smart home device; and receiving a second operation result sent by the smart home console, and sending the second operation result to the control terminal, where the second operation result is obtained through execution of the second operation instruction by the smart home device.

An embodiment of the present disclosure also provides a smart home control method, which may include: sending a first operation request to a smart home control server, such that the smart home control server sends verification information of the first operation request to a control terminal and receives an authentication result fed back by the control terminal, where the authentication result is obtained through authentication of the verification information by the control terminal; in response to a positive authentication result, making the smart home control server send a first operation instruction of the first operation request to a smart home console and receive a first operation result fed back by the smart home console, where the first operation result is obtained through execution of the first operation instruction by a smart home device, and the control terminal is authorized to operate the smart home device; and receiving the first operation result sent by the smart home control server.

An embodiment of the present disclosure also provides a smart home control method, which may include: receiving an operation instruction sent by a smart home control server, where the operation instruction includes a first operation instruction sent by a smart home device service provider or a second operation instruction sent by a control terminal, and the first operation instruction being authenticated by the control terminal which is authorized to operate a smart home device; sending the operation instruction to the smart home device; receiving an operation result sent by the smart home device, where the operation result is obtained through execution of the operation instruction by the smart home device; and sending the operation result to the smart home control server, such that the smart home control server feeds back the operation result to the smart home device service provider or the control terminal.

An embodiment of the present disclosure also provides a smart home control method, which may include: sending a second operation instruction to a smart home control server, such that the smart home control server sends the second operation instruction to a smart home console and receives a second operation result fed back by the smart home console, where the second operation result is obtained through execution of the second operation instruction by a smart home device, and authorization for operating the smart home device has been obtained before the second operation instruction is sent; and receiving the second operation result fed back by the smart home control server.

An embodiment of the present disclosure also provides a smart home control device, which may include a memory, a processor, a program stored in the memory and executable by the processor, and a data bus for realizing connection and communication between the processor and the memory, where the program, when executed by the processor, implements the steps of the above method.

An embodiment of the present disclosure provides a computer-readable storage medium storing one or more programs which are executable by one or more processors to implement the steps of the above method.

DETAILED DESCRIPTION

In order to enable those having ordinary skill in the art to better understand technical schemes of the present disclosure, the technical schemes in the embodiments of the present disclosure are clearly and completely described in the following with reference to the drawings in the embodiments of the present disclosure. It is obvious that the described embodiments are only some embodiments of the present disclosure and are not exhaustive. All other embodiments obtained by those having ordinary skill in the art based on the embodiments of the present disclosure without inventive effort shall fall within the scope of protection of the present disclosure.

The terms "first", "second", "third", "fourth", etc. in the description, the claims and the drawings of the present disclosure are intended to distinguish between different objects and are not necessarily to describe a specific order. Further, the terms "include" and "comprise" and any variations thereof are intended to encompass non-exclusive inclusion. For example, a process, method, system, product, or device that includes a series of steps or components is not limited to those steps or components listed, but may include additional steps or components that are not explicitly stated or are inherent to such a process, method, product, or device.

The term "embodiment" mentioned in the article means that a particular feature, structure, or characteristic described in connection with the embodiment may be included in at least one embodiment of the present disclosure. Appearance of the term in various parts in the specification does not necessarily refer to the same embodiment, nor is it an independent or alternative embodiment mutually exclusive of other embodiments. It is understood explicitly and implicitly by those having ordinary skill in the art that the embodiments described herein may be combined with other embodiments.

Before introducing the embodiments of the present disclosure, the related terms involved in the present disclosure will be explained firstly.

Figure 1:
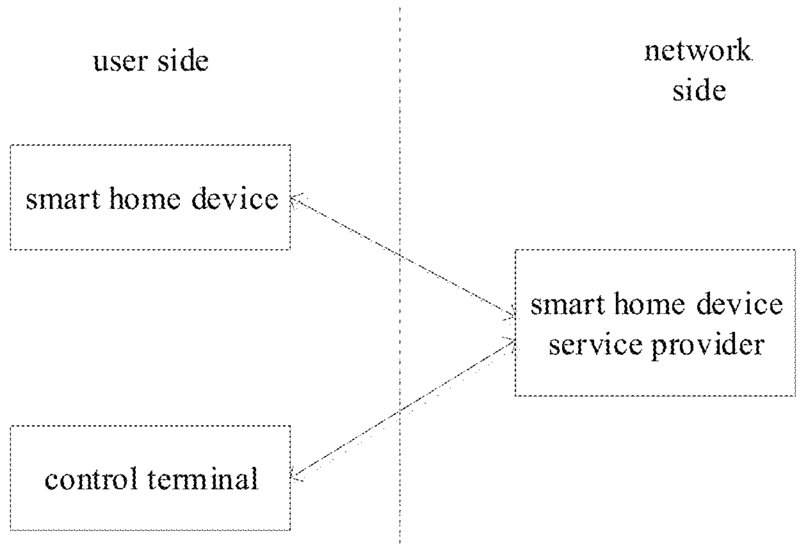
FIG. 1 is a structural block diagram of a smart home system provided by the existing technology.

As shown in FIG. 1, a smart home system in the existing technology generally includes a smart home device and a control terminal (such as mobile phone) on the user side, and a smart home device service provider on the network side. The control terminal downloads a smart home control program provided by the smart home device manufacturer, and controls the smart home device through the smart home control program. However, the above smart home system has the following problems. 1. The smart home device service provider can collect personal data of the control terminal through the smart home control program installed on the control terminal. 2. The smart home device service provider has to connect to the public network in order to offer external services, which exposes it to the security risk of hacker attacks and consequently unauthorized access to smart home device data.

Figure 2:
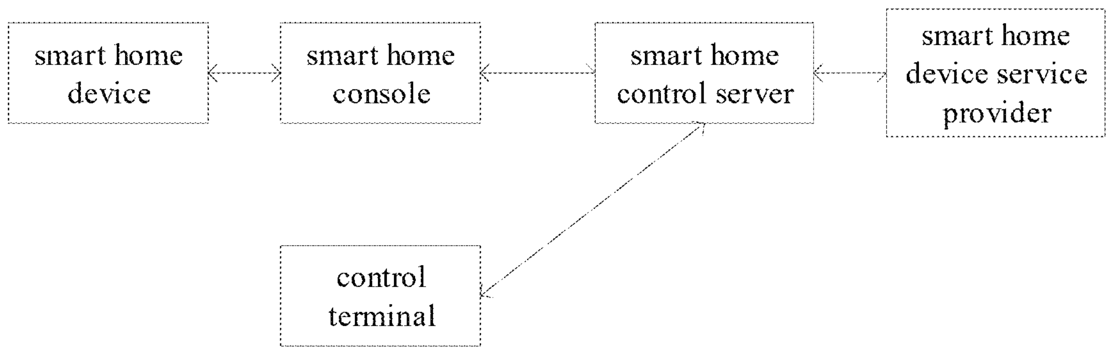
FIG. 2 is a structural block diagram of a smart home system provided by an embodiment of the disclosure.

Referring to FIG. 2, a smart home control system provided by an embodiment of the present disclosure includes a control terminal, a smart home device service provider, a smart home control server, a smart home console and a smart home device. The smart home control server can exchange data with the control terminal, the smart home device service provider and the smart home console, and the smart home console can exchange data with the smart home device.

IP Multimedia Subsystem (IMS), as the underlying infrastructure for VoLTE/VoNR calling in 5G and 6G networks, has the advantages of high security, real-time performance and reliability. 3GPP R16 has also defined the IMS DC standard, which, when integrated with WebRTC technology, allows for the simultaneous establishment of IMS DCs and audio-video channels. This enables features such as screen sharing, AR overlay, and even fully immersive experiences with synchronized auditory, visual, tactile, and kinesthetic sensations during high-definition video calls. This technology is widely used in 5G and 6G architectures. It does not limit the specific transmission content, and can transmit any information such as texts, pictures, videos, locations and interactive information. The current 5G new calling solution offers a range of features including multimedia caller display, visual menus, screen sharing, AR tagging, and more. This not only enhances the calling experience for personal users, but also provides new industry-specific communication capabilities for enterprise users.

Figure 3:
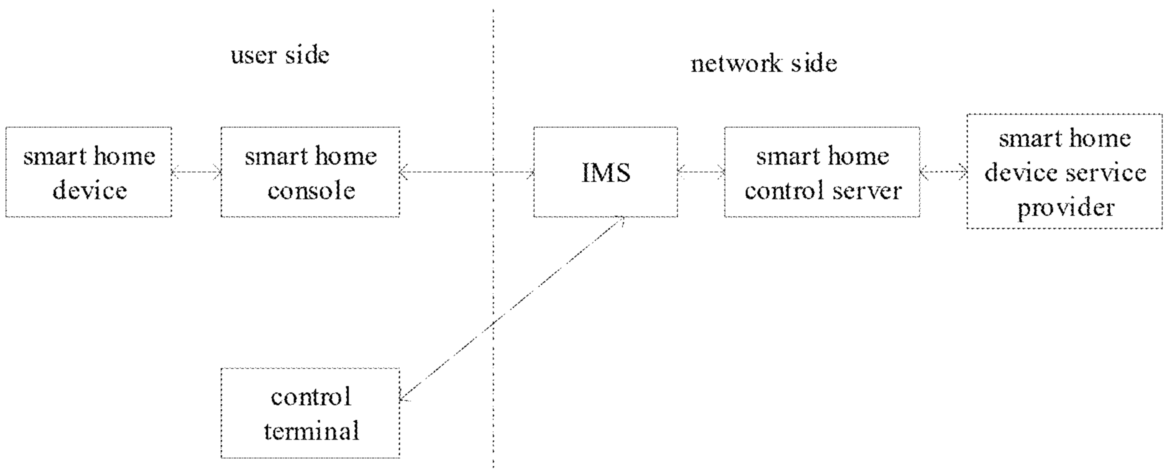
FIG. 3 is a structural block diagram of another smart home system provided by an embodiment of the disclosure.

Referring to FIG. 3, a smart home system provided by an embodiment of the present disclosure includes a smart home console, an IMS, a smart home control server, a smart home device, a smart home device service provider, and a control terminal.

The IMS is configured to establish a first DC between the smart home control server and the control terminal and a second DC between the smart home console and the smart home control server.

The smart home console is configured to communicate with the smart home device through a control program of the smart home device, and communicate with the smart home control server through the second DC.

The smart home control server is configured to communicate with the smart home device service provider, communicate with the smart home console through the second DC and communicate with the control terminal through the first DC.

The control terminal is configured to obtain operation information through a control program of the smart home console, and communicate with the smart home control server through the first DC.

The smart home device is configured to respond to the operation information, and communicate with the smart home console.

The smart home control server is also configured to pre-store the control program of the smart home device. The control program of the smart home device is loaded by the smart home console through the second DC.

The smart home device service provider is configured to provide services for the smart home device, and communicate with the smart home control server.

It should be noted that the functions of the smart home device service provider include: (1) providing a smart home device management and maintenance platform that allows maintenance personnel to remotely access and control the smart home device; and (2) realizing communication with the smart home device by interacting with the smart home control server.

It should be noted that the smart home device entity provides home services and can exchange information with the smart home console, such as reporting smart home data and providing remote diagnosis and control functions.

It can be understood by those having ordinary skill in the art that IMS, as the voice infrastructure of voice networks in the 5G and 6G era, provides users with real-time or non-real-time end-to-end multimedia services. The functions of the IMS in this embodiment include:

(1) exchanging information with the smart home control server to provide IMS access services for the control terminal; and (2) providing IMS secure DC management for the smart home console, and encrypted data transmission.

It should be noted that the functions of the smart home console include: (1) establishing an IMS DC with the smart home control server through the IMS, enabling authorized data exchange between the smart home device and the smart home device service provider; (2) identifying multiple smart home device entities of different types or identical type, enabling information exchange with the smart home devices, such as acquiring operation data of the smart home devices and sending control instructions to the smart home devices; and (3) interacting with a control terminal APP in a "white list", allowing users to use the control terminal APP to control the smart home device. The "white list" refers to binding information between the control terminal authorized by the smart home device service provider and the smart home device, which is stored in the smart home control server.

It will be understood by those having ordinary skill in the art that the functions of the smart home control server include: (1) establishing a binding relationship between the control terminal and the smart home device, and saving a "white list" for access to the smart home console to enable interaction between the control terminal and the smart home console; (2) saving remote control applets for different smart home devices, and distributing the different applets based on a request from the smart home console; (3) providing secure IMS DC management for the smart home console and encrypted data transmission; (4) providing access services for the smart home device service provider and executing the user authorization control process of the control terminal; and (5) upon receiving a request for accessing the smart home console, providing access services to the smart home device service provider, and routing a session request of the smart home device service provider to the designated smart home console.

For the smart home system in the existing technology, different smart home device manufacturers provide their own smart home device control programs, and users have to install multiple APPs on the control terminal, which is very inconvenient.

It can be understood by those having ordinary skill in the art that the functions of the control terminal include: directly communicate with the smart home control server by loading a smart home console APP or an applet, so as to realize remote control of the smart home device.

In this embodiment, the smart home console loads and stores the control program of the smart home device from the smart home control server through the second DC. The control terminal is only required to install a control program of the smart home console, so as to allow the control terminal to control different smart home devices through the control program of one smart home console, which is convenient for users.

In addition, in this embodiment, the smart home console and the control terminal realize different functions, and the smart home console and the control terminal communicate with the smart home control server through different DCs. This reduces the performance requirements for the smart home console and the control terminal. For example, a server is adopted for the smart home console, and a mobile phone or tablet computer is used as the control terminal. The remote control of the smart home device by the control terminal is not limited by geographical locations, and data interaction between the control terminal and smart home console is more convenient and flexible.

For the smart home system in the existing technology, the smart home device service provider can directly interact with the smart home device, so there is a security risk regarding the direct acquisition of personal data of users (such as camera data, voice data, etc.) by the smart home device service provider.

In an embodiment, the control terminal in the smart home system is also configured to authenticate a smart home device operation request from the smart home device service provider.

In this embodiment, the user authenticates the smart home device operation request from the smart home device service provider through the control terminal, thus reducing the risk that the smart home device service provider obtains the data of the smart home device.

Figure 4:
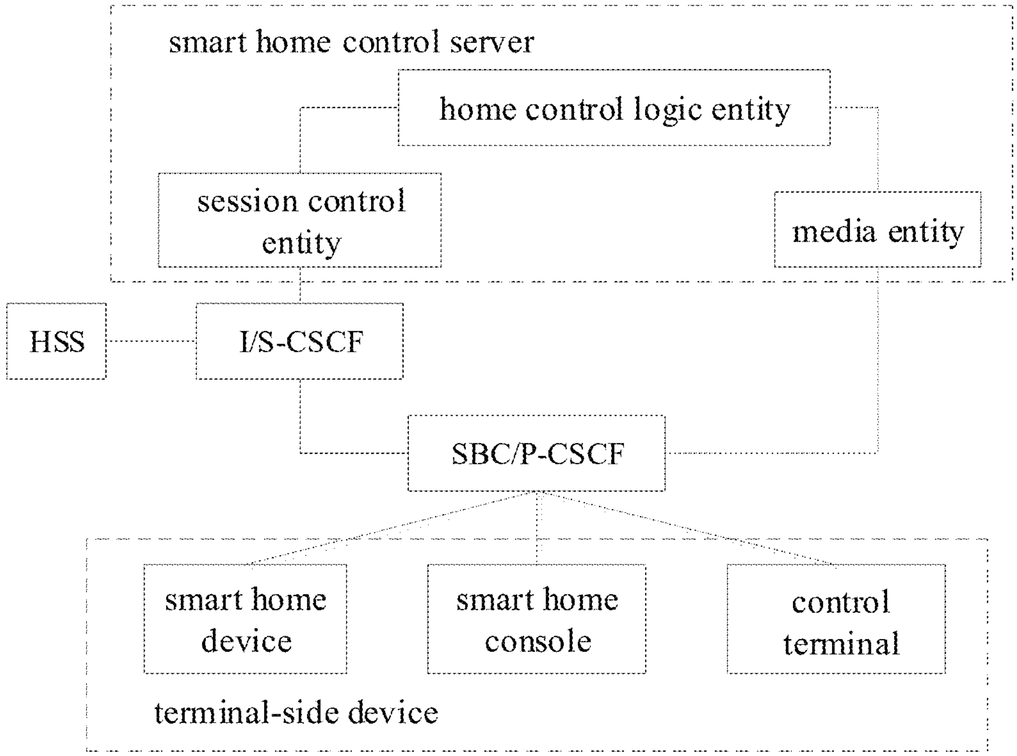
FIG. 4 is a structural block diagram of yet another smart home system provided by an embodiment of the disclosure.

Referring to FIG. 4, the functions of each part of the smart home system in this embodiment are further explained in conjunction with the IMS.

Terminal-side devices include the smart home device, the smart home console, the control terminal and the like. The terminal-side devices provide service experience for end users by interacting with network-side entities (the smart home control server and the smart home device service provider). In this embodiment, the terminal-side devices support DC session negotiation with the network-side entities, and application data received from the network-side entities through the DCs is processed and presented locally. Alternatively, application data related to user operation are transmitted through the DCs to the network-side entities to realize specific service logic.

Session Border Controller/Proxy-Call Session Control Function (SBC/P-CSCF), as an access control entity, provides the terminal-side devices with access to a signaling plane and a media plane. In this embodiment, SBC/P-CSCF supports DC session negotiation, and as a DC forwarding entity, establishes DCs with "terminal/UE" and "media entity" respectively to realize transparent data forwarding.

Interrogating/Serving-Call Session Control Function (I/S-CSCF), as a session control entity, has query/service-call session control functions, provides multi-application terminals with basic functions in an IMS network such as registration authentication, session control, call routing, etc., and can trigger a call to a "call entity", without special requirements in this embodiment.

Home Subscriber Server (HSS) is responsible for storing authentication information, service trigger rules and other information for multi-application terminals, without special requirements in this embodiment.

The session control entity, as a signaling-side control network element of a multi-application system, assumes the responsibility of IMS call management, which, in the present disclosure, specifically includes: (1) providing management for audio-video calls and DC calls, including but not limited to: call establishment, media negotiation, call event reporting, etc. ; and (2) providing management for a media entity, such that the media entity is managed according to a control instruction of an application entity, including but not limited to: application, modification and deletion of the DC, application, modification and deletion of audio-video conference resources, and application, modification and deletion of speech recognition capability.

The media entity, as a media plane control network element of the multi-application system, provides media services for the multi-application system, including: (1) providing media capability management, where the media entity is connected with network elements such as "call entity", "supplementary service application entity" and "IMS access network element (SBC/P-CSCF)", and used for the creation, modification and deletion of media resources; (2) providing DC management, where the media entity is used for the creation, modification and deletion of the DC; and (3) providing multi-application data forwarding, where the media entity receives application data from a supplementary service application entity and forwards the application data to a terminal through the DC, alternatively, the terminal sends the application data to the media entity through the DC, and the media entity extracts the application data and forwards the application data to the application entity.

A home control logic entity provides smart home control logic. The home control logic entity is connected with the call entity to obtain session event information from the call entity, and perform session control according to specific service logic, including but not limited to: (1) modifying a media path of a session and anchoring session media to the media entity; and (2) being connected with the media entity to send the application data to the terminal through the DC, and receiving the application data and a service control instruction from the terminal side through the DC of the media entity.

The use process of a smart safe home system is as follows.

In response to a user using an installed smart home console APP at a control terminal, a smart home console feeds back a smart home management list In response to the user clicking on a device (such as air conditioner) in the smart home management list, an instruction is sent to a smart home control server, which creates an IMS DC with the smart home console. The smart home console dynamically loads a service applet of the smart home device through the smart home control server. Through the smart home control server, a control terminal and the home equipment complete device authentication.

After the user operates the home device applet (such as turning on the air conditioner) at the control terminal, an instruction is sent to the smart home control server, which creates an IMS DC with the smart home console and sends the operation instruction (turning on the air conditioner) to the smart home console. The smart home console sends the operation instruction to the smart home device through a remote control applet, so that the smart home device (air conditioner) executes the instruction (turns on the air conditioner).

Figure 5:
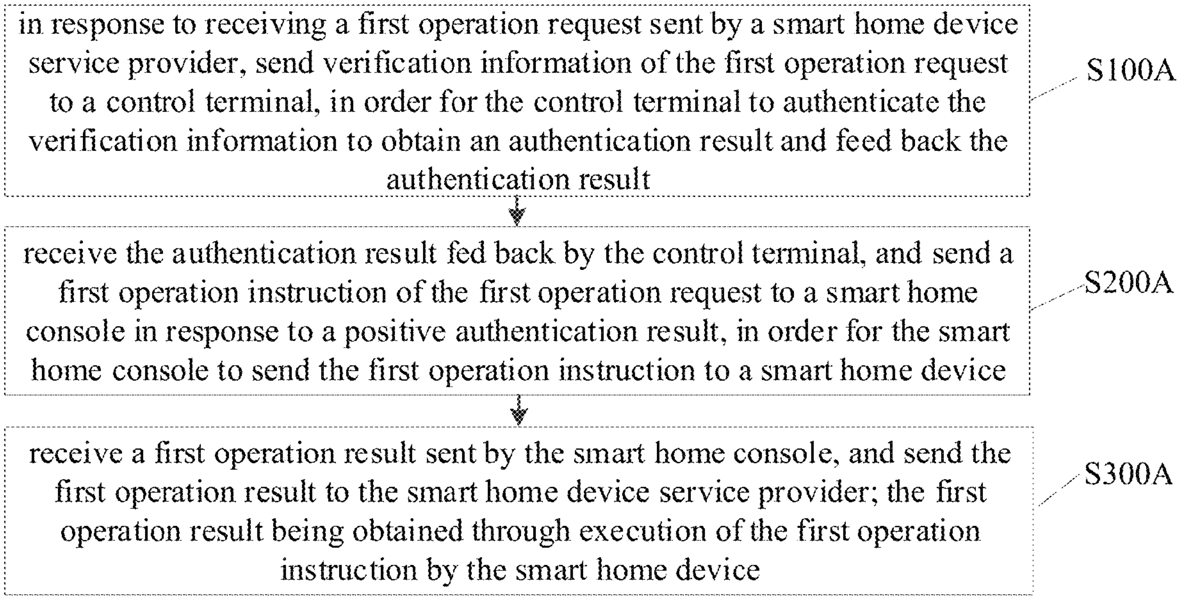
FIG. 5 is a flowchart of a control method applied to a smart home control server according to an embodiment of the disclosure.
Figure 6:
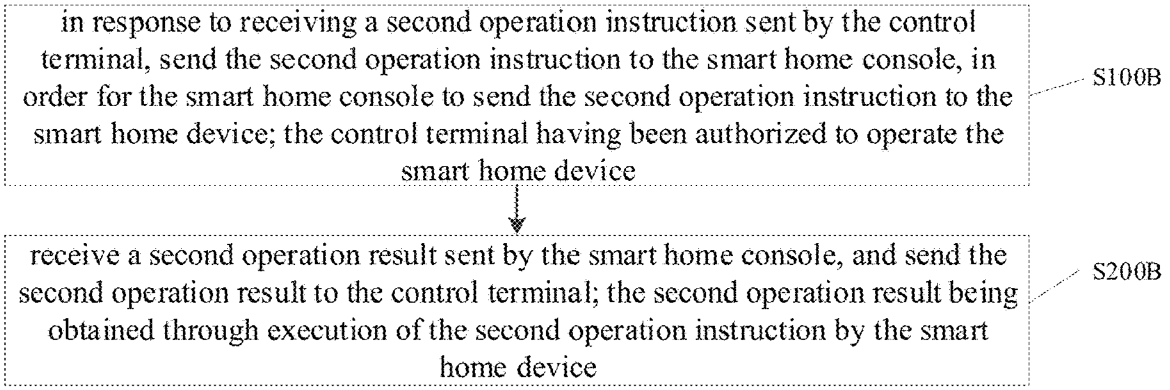
FIG. 6 is a flowchart of another control method applied to a smart home control server according to an embodiment of the disclosure.

Referring to FIGS. 5 and 6, an embodiment of the present disclosure provides a smart home control method, which is applied to a smart home control server and includes the following steps.

In a step of S100A, in response to receiving a first operation request sent by a smart home device service provider, verification information of the first operation request is sent to a control terminal, such that the control terminal authenticates the verification information to obtain an authentication result and feed back the authentication result.

In a step of S200A, in response to receiving a positive authentication result fed back by the control terminal, a first operation instruction of the first operation request is sent to a smart home console, such that the smart home console send the first operation instruction to a smart home device, In a step of S300A, in response to receiving a first operation result sent by the smart home console, the first operation result is sent to the smart home device service provider. The first operation result is obtained through execution of the first operation instruction by the smart home device.

In a step of S100B, in response to receiving a second operation instruction sent by the control terminal, the second operation instruction is sent to the smart home console, such that the smart home console sends the second operation instruction to the smart home device. Then, the control terminal is authorized to operate the smart home device.

In a step of S200B, in response to receiving a second operation result sent by the smart home console, the second operation result is sent to the control terminal. The second operation result is obtained through execution of the second operation instruction by the smart home device.

It can be understood by those having ordinary skill in the art that steps S100A to S300A describe how the smart home device service provider operates the smart home device through the smart home control server and the smart home console, and steps S100B to S200B describe how the control terminal operates the smart home device through the smart home control server and the smart home console.

It should be noted that the authentication result may be positive or negative. The smart home device service provider can get the authority to operate the smart home device in response to a positive authentication result, otherwise, in response to a negative authentication result, the smart home device service provider cannot operate the smart home device.

It can be understood by those having ordinary skill in the art that data can be transmitted between the smart home control server, the control terminal and the smart home console through a DC established by an IMS, or through other DCs, which is not limited by the embodiment of the present disclosure.

According to the smart home control method provided by the embodiment of the present disclosure, the smart home device service provider sends the first operation request for the smart home device to the smart home control server, which in turn sends the first operation request to the control terminal for authentication. After the authentication is passed, the smart home control server sends the first control instruction of the first operation request to the smart home console, receives the first operation result fed back by the smart home console and feeds back the first operation result to the smart home device service provider. That is, the smart home device service provider cannot directly operate the smart device, instead, the smart home device service provider has to be authenticated by the control terminal and then operates the smart home device through the smart home control server and the smart home console, thereby improving the data security of the smart home device. In addition, the control terminal needs operation authorization to control the smart home device, and then the control terminal can operate the smart home device through the smart home control server and the smart home console, thereby further improving the data security of the smart home device. Further, there is no direct interaction between the control terminal and the smart home device service provider, instead, the interaction between the control terminal and the smart home device service provider needs to be carried out through the smart home control server, which reduces the risk of the smart home device service provider collecting control terminal data.

Figure 7:
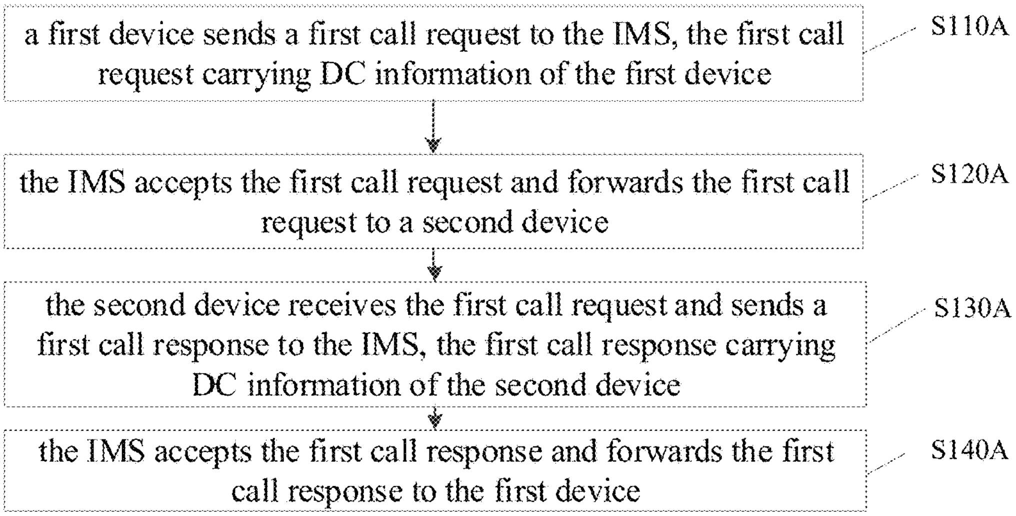
FIG. 7 is a flowchart of steps for establishing a first data channel (DC) according to an embodiment of the disclosure.

In an embodiment, referring to FIG. 7, data are transmitted between the smart home control server and the control terminal through a first DC established by an IMS. The first DC is established by the following steps.

In a step of S110A, a first device sends a first call request to the IMS. The first call request carries DC information of the first device.

In a step of S120A, the IMS accepts the first call request and forwards the first call request to a second device;

In a step of S130A, the second device receives the first call request and sends a first call response to the IMS. The first call response carries DC information of the second device.

In a step of S140A, the IMS accepts the first call response and forwards the first call response to the first device. The first device is the smart home control server or the control terminal. The second device is the smart home control server or the control terminal, and different from the first device.

Figure 8:
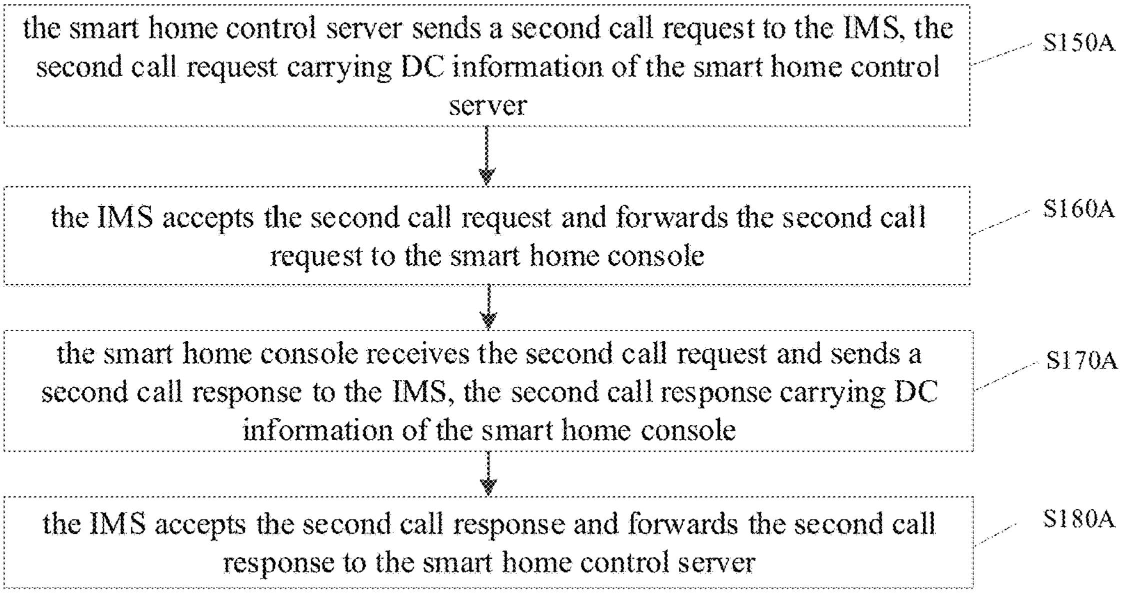
FIG. 8 is a flowchart of steps for establishing a second DC according to an embodiment of the disclosure.

In an embodiment, referring to FIG. 8, data are transmitted between the smart home control server and the smart home console through a second DC established by an IMS. The second DC is established by the following steps.

In a step of S150A, the smart home control server sends a second call request to the IMS. The second call request carries DC information of the smart home control server.

In a step of S160A, the IMS accepts the second call request and forwards the second call request to the smart home console.

In a step of S170A, the smart home console receives the second call request and sends a second call response to the IMS. The second call response carries DC information of the smart home console.

In a step of S180A, the IMS accepts the second call response and forwards the second call response to the smart home control server.

When the smart home device service provider operates the home device (for example, device version upgrade), an application needs to be sent to the control terminal through the smart home control server. For example, the application is sent to the control terminal of a user through the smart home control server by means of voice calls or messages, and only upon confirmation from the control terminal, the smart home device service provider gains permission to operate the smart home device, thereby enabling operations such as device version upgrade.

Figure 9:
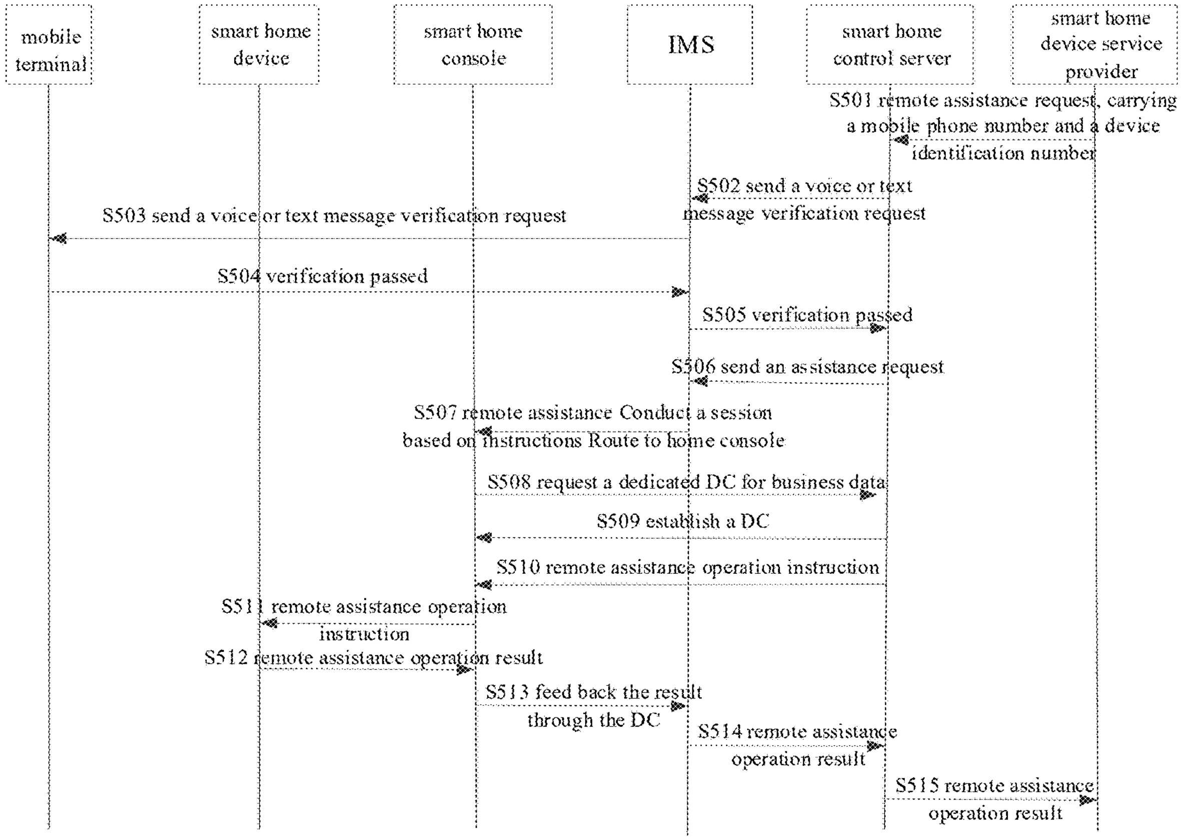
FIG. 9 is a timing diagram of a smart home device service provider operating a smart home device according to an embodiment of the disclosure.

Please refer to FIG. 9, which illustrates a process of remote control and collaboration provided by the smart home device service provider by calling mobile phones of a user using IMS calls.

In this embodiment, authorization between the mobile number of the user and the smart home device (air conditioning device) has been completed, and the smart home device service provider requests a remote assistance connection to the smart home device. The process of remote control and collaboration includes the following steps.

In a step of 501, the smart home device service provider uses the mobile number and a device identification number to request access to the smart home device through the smart home control server.

In a step of 502, the smart home control server initiates a device authentication request to the IMS.

In a step of 503, the IMS sends a voice or text authentication message to the mobile phone bound to the smart home device.

In a step of 504, the mobile phone returns an authentication result.

In a step of 505, the IMS feeds back the authentication result to the smart home server.

In a step of 506, the smart home control server forwards a remote assistance request of the home service provider to the IMS.

In a step of 507, the IMS routes the remote assistance request to the smart home console.

In a step of 508, the smart home console sends an operation instruction to request the smart home control server to create an IMS DC.

In a step of 509, the smart home control server returns a DC establishment completion message.

In a step of 510, the smart home control server sends a remote assistance operation instruction to the smart home console through the IMS DC;

In a step of 511, the smart home console forwards the remote assistance service request to the smart home device.

In a step of 512, the smart home device returns a remote assistance operation result to the smart home console.

In a step of 513, the smart home console forwards the remote assistance operation result to the IMS through the IMS DC.

In a step of 514, the IMS forwards the remote assistance result to the smart home control server.

In a step of 515, the smart home control server sends the operation result to the smart home device service provider.

Figure 10:
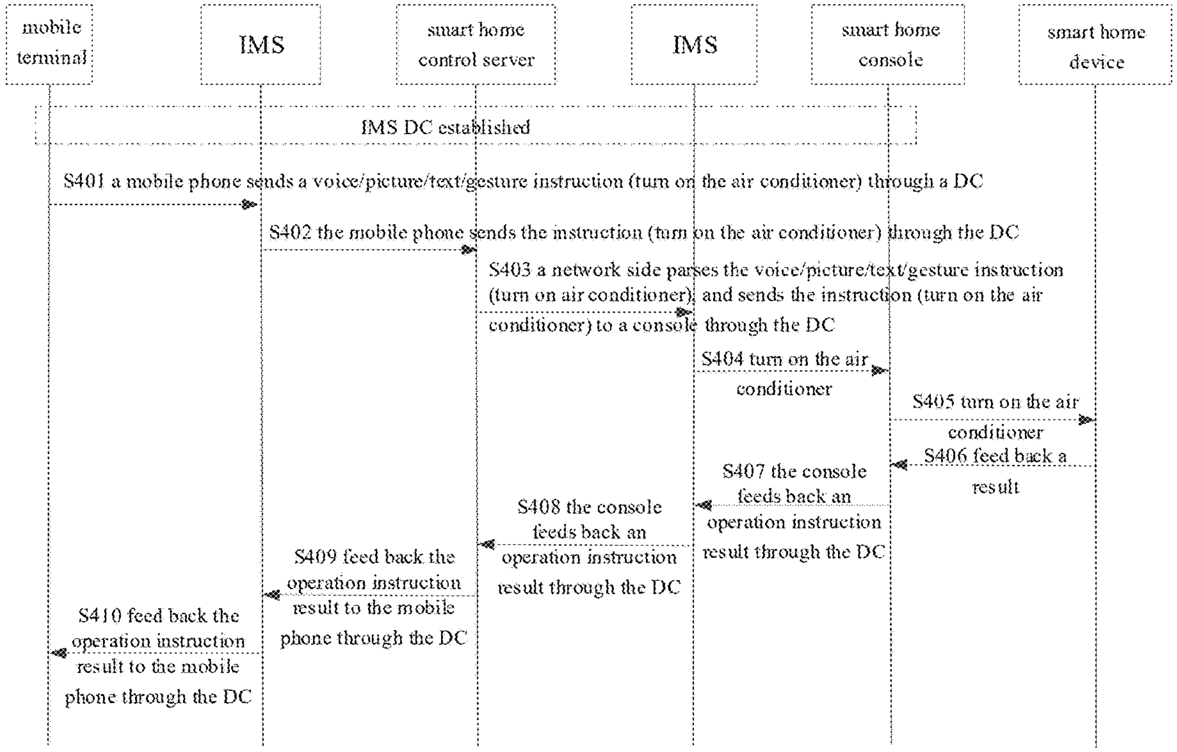
FIG. 10 is a timing diagram of a method for controlling a smart home device by a control terminal according to an embodiment of the disclosure.

Please refer to FIG. 10, which illustrates a process of remotely controlling a smart home initiated by a user through a mobile phone using IMS calls.

In this embodiment, an IMS DC has been established between the mobile phone, a smart home console and a smart home control server.

In a step of 401, the user sets an instruction message (turn on the air conditioner) and sends the instruction message to an IMS through a smart home console APP on the mobile phone. The instruction which may be voice, picture, text or gesture being transmitted through the IMS DC.

In a step of 402, the IMS forwards the mobile phone-side instruction to the smart home control server.

In a step of 403, after receiving the mobile phone-side instruction, the smart home control server parses and converts the instruction into a console-side instruction, which (turn on the air conditioner) is in turn sent to the IMS through the IMS DC.

In a step of 404, the IMS receives a server-side instruction (turn on the air conditioner), and then forwards the server-side instruction to the smart home console.

In a step of 405, the smart home console sends a service instruction (turn on the In a step of 406, the smart home device feeds back a service instruction (turn on the air conditioner) execution result to the smart home console.

In a step of 407, the smart home console feeds back the instruction execution result to the IMS through a console-side DC.

In a step of 408, the IMS forwards the instruction execution result to the smart home control server.

In a step of 409, the smart home control server sends the instruction execution result to the IMS through a mobile phone-side DC; and In a step of 410, the IMS forwards the instruction execution result to the mobile phone.

In an embodiment, the smart home control server stores a control program of the smart home device, such that the smart home console loads the control program of the smart home device from the smart home control server according to a first operation instruction or a second operation instruction.

The smart home control server stores the control program of the smart home device. Upon receiving the operation instruction, the smart home console loads the control program of the smart home device from the smart home control server according to the operation instruction, thereby reducing the resources consumed by storing the control program of the smart home device in the smart home console.

In an embodiment, the control terminal stores a control program of the smart home console, and the second operation instruction is sent by the control program of the smart home console.

The smart home console loads the control program of the smart home device from the smart home control server according to the operation instruction. The control terminal can control multiple smart home devices through a single program by installing the control program of the smart home console, thereby minimizing the resource usage of control programs on the control terminal.

Figure 11:
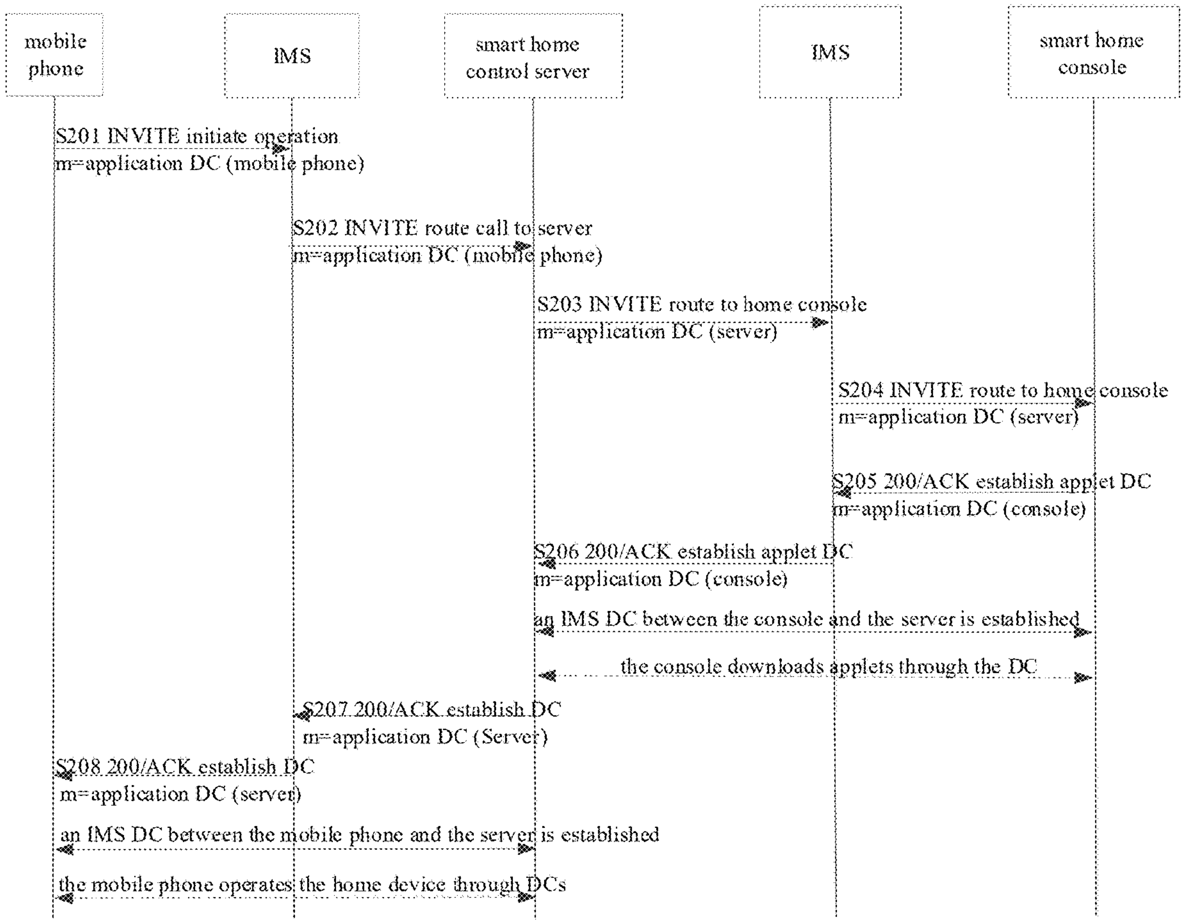
FIG. 11 is a timing diagram of an establishment process of a first DC and a second DC according to an embodiment of the disclosure.

Please refer to FIG. 11, which illustrates a process of loading different remote control applets by a smart home console.

In this embodiment, the remote control applets of different smart home device manufacturers are preset on a smart home control server. A control terminal in this embodiment is a mobile phone, and the process of loading different remote control applets includes the following steps In a step of 201, a user initiates a call operation by using a mobile phone, such that a remote control identifier of media data information of a smart home device DC operated by the mobile phone is carried to an IMS.

In a step of 202, after receiving the call, the IMS forwards the call to the smart home control server.

In a step of 203, the smart home control server carries a server DC media data information to the IMS according to operation instruction information.

In a step of 204, after receiving the call, the IMS forwards the call to the smart home console.

In a step of 205, the smart home console responds and carries console DC media information to the IMS.

In a step of 206, after receiving the response, the IMS forwards the response to the smart home control server. After this step is completed, an IMS DC between the smart home console and the smart home control server is established. Upon discovering that a remote control applet is not loaded, the smart home console will dynamically load the remote control applet of a smart home device through the DC.

In a step of 207, the smart home control server responds and carries server DC media information to the IMS. In a step of 208, the IMS receives the response and forwards the response to the mobile phone. After this step is completed, an IMS DC between the mobile phone and the home control server is established. The mobile phone can operate the remote control applet through the DCs. Based on the above description of the embodiments of the smart home system, an embodiment of the present disclosure provides a smart home control method, which can be applied to the smart home system shown in FIG. 2, and can be specifically executed through the interaction between the smart home device service provider and the smart home console as shown in FIG. 2.

Figure 12:
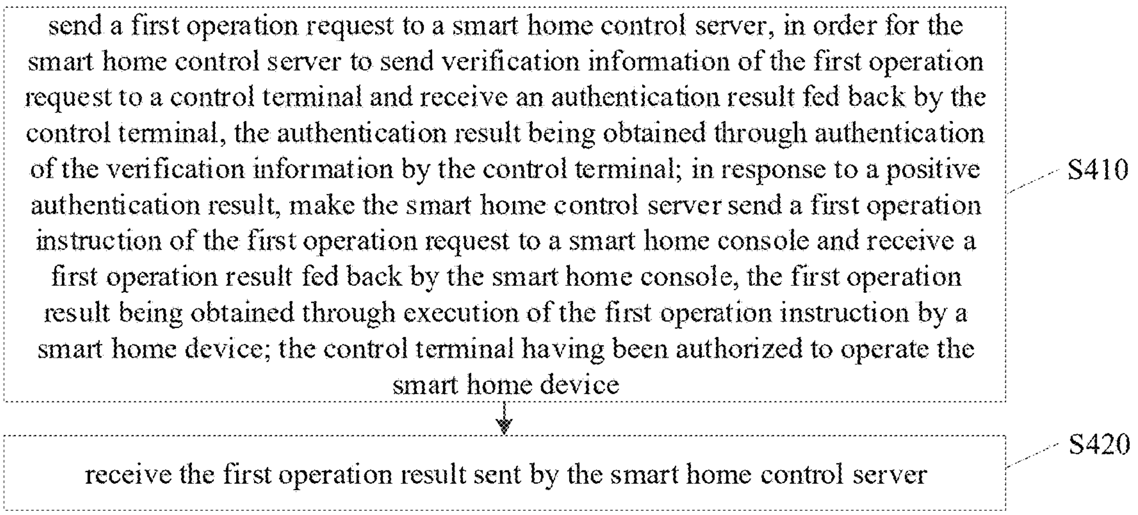
FIG. 12 is a flowchart of a control method applied to a smart home device service provider according to an embodiment of the disclosure.

Referring to FIG. 12, an embodiment of the present disclosure provides a smart home control method, which is applied to a smart home device service provider and includes the following steps.

In a step of S410, a first operation request is sent to a smart home control server, such that the smart home control server sends verification information of the first operation request to a control terminal and receives an authentication result fed back by the control terminal. The authentication result is obtained through authentication of the verification information by the control terminal. In response to a positive authentication result, the smart home control server is configured to send a first operation instruction of the first operation request to a smart home console and receive a first operation result fed back by the smart home console. The first operation result is obtained through execution of the first operation instruction by a smart home device. Then, the control terminal is authorized to operate the smart home device.

In a step of S420, the first operation result sent by the smart home control server is received.

Based on the above description of the embodiments of the smart home system, an embodiment of the present disclosure provides a smart home control method, which can be applied to the smart home system shown in FIG. 2, and can be specifically executed through the interaction between the smart home console and the control terminal as well as the smart home device service provider as shown in FIG. 2.

Figure 13:
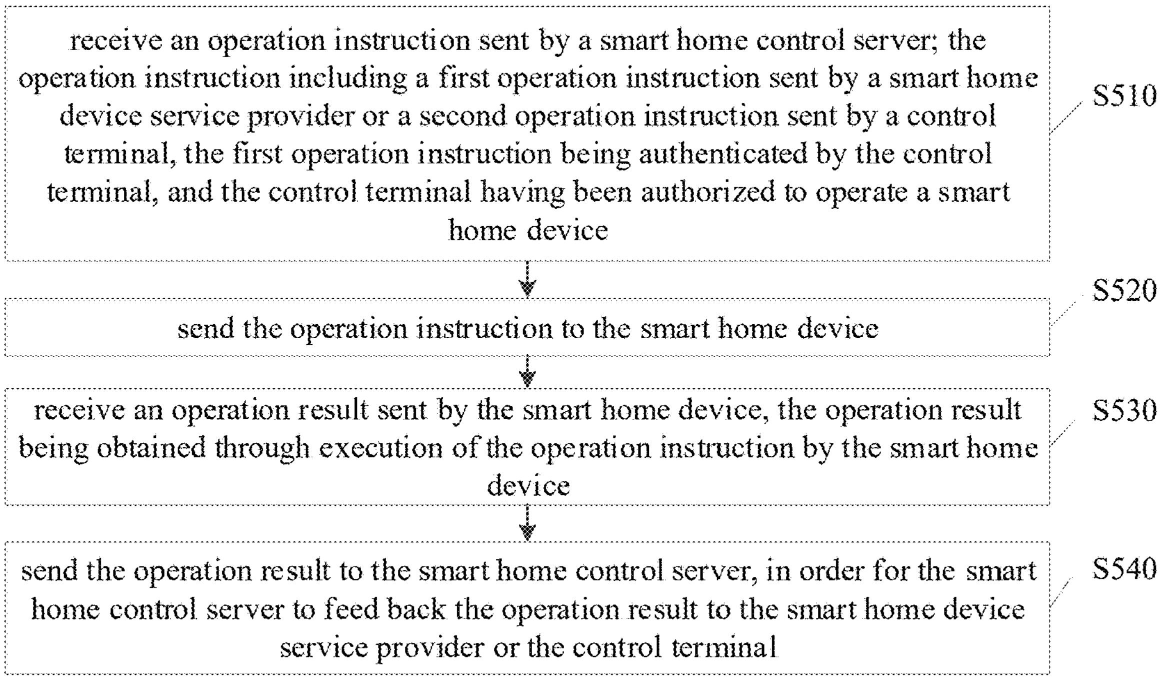
FIG. 13 is a flowchart of a control method applied to a smart home console according to an embodiment of the disclosure.

Referring to FIG. 13, an embodiment of the present disclosure provides a smart home control method, which is applied to a smart home console and includes the following steps.

In a step of S510, an operation instruction sent by a smart home control server is received. The operation instruction includes a first operation instruction sent by a smart home device service provider or a second operation instruction sent by a control terminal. The first operation instruction is authenticated by the control terminal, which is authorized to operate a smart home device.

In a step of S520, the operation instruction is sent to the smart home device.

In a step of S530, an operation result sent by the smart home device is received. The operation result is obtained through execution of the operation instruction by the smart home device.

In a step of S540, the operation result is sent to the smart home control server, such that the smart home control server feeds back the operation result to the smart home device service provider or the control terminal.

Based on the above description of the embodiments of the smart home system, an embodiment of the present disclosure provides a smart home control method, which can be applied to the smart home system shown in FIG. 2, and can be specifically executed through the interaction between the control terminal and the smart home console as shown in FIG. 2.

Figure 14:
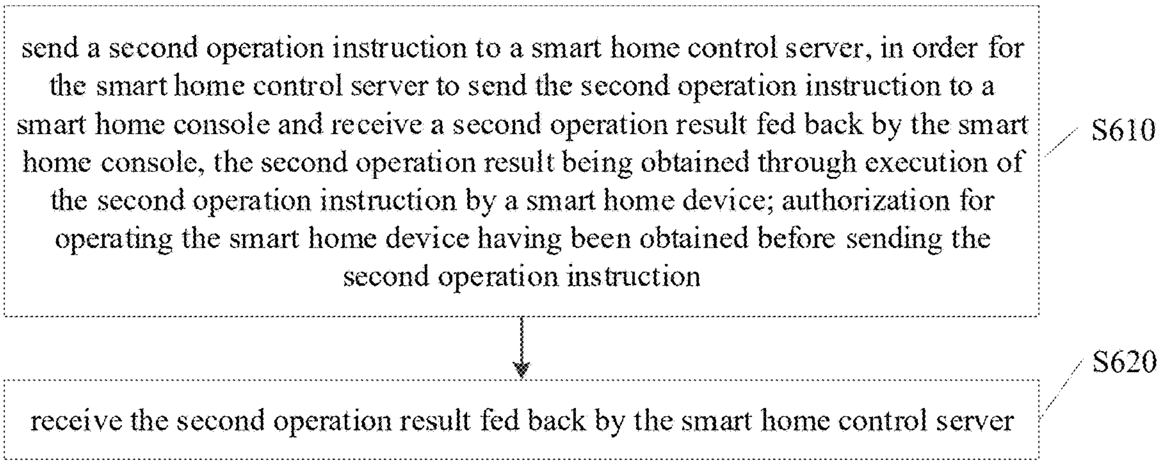
FIG. 14 is a flowchart of a control method applied to a control terminal according to an embodiment of the disclosure.

Referring to FIG. 14, an embodiment of the present disclosure provides a smart home control method, which is applied to a control terminal and includes the following steps.

In a step of S610, a second operation instruction is sent to a smart home control server, such that the smart home control server sends the second operation instruction to a smart home console and receives a second operation result fed back by the smart home console. The second operation result is obtained through execution of the second operation instruction by a smart home device. Authorization for operating the smart home device has been obtained before the second operation instruction is sent.

In a step of S620, the second operation result fed back by the smart home control server is received.

Figure 15:
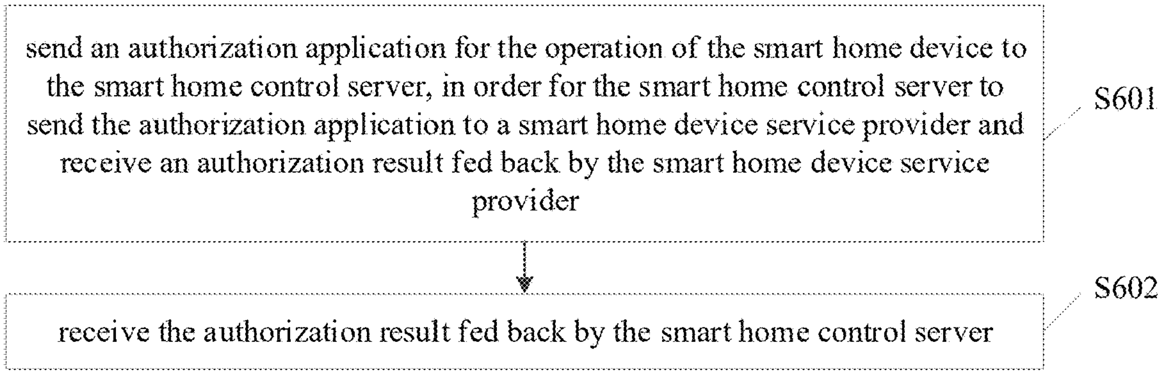
FIG. 15 is a flowchart of steps for obtaining an authorization for operating a smart home device according to an embodiment of the disclosure.

In an embodiment, referring to FIG. 15, the authorization for operating the smart home device is obtained by the following steps.

In a step of S601, an authorization application for the operation of the smart home device is sent to the smart home control server, such that the smart home control server sends the authorization application to a smart home device service provider and receive an authorization result fed back by the smart home device service provider.

In a step of S602, the authorization result fed back by the smart home control server is received.

It should be noted that a binding relationship has to be established when the control terminal operates the smart home for the first time, which is not necessary for subsequent operations.

Figure 16:
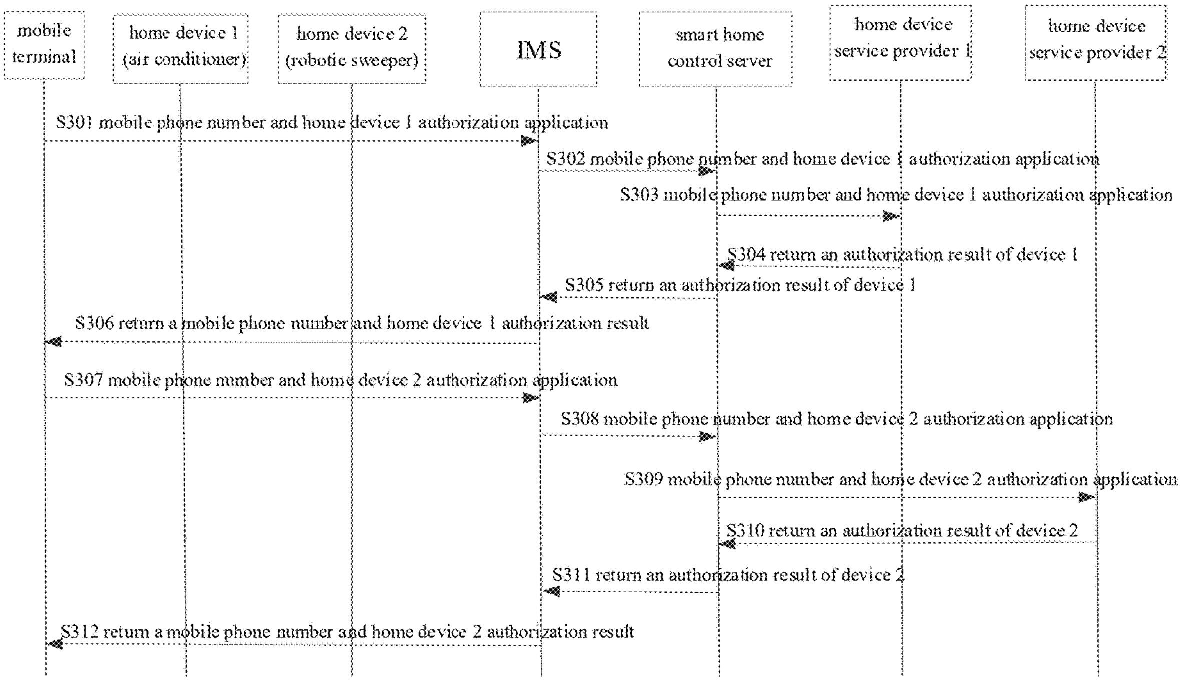
FIG. 16 is a timing diagram of a binding process of a plurality of smart home devices using a control terminal according to an embodiment of the disclosure.

Referring to FIG. 16, a process of binding a mobile phone to a smart home device using a dynamic applet includes the following steps.

In this embodiment, the IMS DC has been established between the mobile phone and a smart home control server.

In a step of 301, the mobile phone initiates a call through the IMS DC, and carries a smart home device 1 (air conditioner) number to an IMS. The device number may be a QR code or a bar code.

In a step of 302, after receiving the call, the IMS forwards the call to the smart home control server.

In a step of 303, the smart home control server routes a session request to a smart home device service provider 1 based on the device number.

In a step of 304, the smart home device service provider 1 notifies the smart home control server to return a mobile phone number and an authorization result of the device. The smart home control server completes the authentication between the mobile phone and the device, and stores a "phone number white list".

In a step of 305, the smart home control server forwards the authorization result to the IMS.

In a step of 306, the IMS receives the authorization result of the home device 1and sends the authorization result of the home device 1 to the mobile phone.

In a step of 307, the mobile phone initiates a call through the IMS DC, and carries a smart home device 2 (robotic sweeper) number to the IMS.

In a step of 308, the IMS receives the call and forwards the call to the smart home control server.

In a step of 309, the smart home control server routes a session request to a smart home device service provider 2 based on the device number.

In a step of 310, the smart home device service provider 2 notifies the smart home control server to return a mobile phone number and an authorization result of the device. The smart home control server completes the authentication between the mobile phone and the device, and stores a "phone number white list".

In a step of 311, the smart home control server forwards the authorization result to the IMS.

In a step of 312, the IMS sends the authorization result of the home device 2 to the mobile phone.

Figure 17:
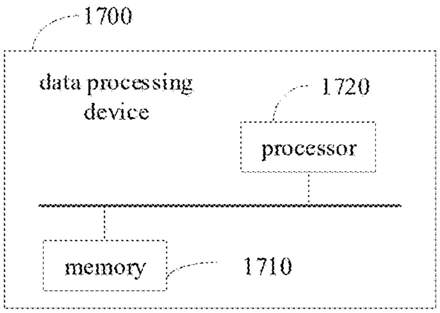
FIG. 17 is a schematic diagram of a smart home control device according to an embodiment of the disclosure.

Please refer to FIG. 17, which is a schematic diagram of a data processing device of another smart home system provided by an embodiment of the disclosure. An embodiment of the present disclosure further provides a data processing device 1700 which includes: a memory 1710, a processor 1720, and a computer program stored in the memory 1710 and executable by the processor 1720.

The Processor 1720 and the Memory 1710 May Be Connected by a Bus or by Other means.

Non-transient software programs and instructions required to implement the data processing method in any of the above embodiments are stored in the memory 1710, and when executed by the processor 1720, cause the processor to perform the data processing method of the data processing device in any of the above embodiments, for example, to perform the above-described method steps S100A to S300A in FIG. 5, S100B to S200B in FIG. 6, S110A to S140A in FIG. 7, S150A to S180A in FIG. 8, S410 to S420 in FIG. 12, S510 to S540 in FIG. 13, S610 to S620 in FIG. 14, or S601 to S602 in FIG. 15.

The apparatus embodiments described above are only for illustration. The units described as separate components may or may not be physically separated, that is, they may be located at one place or distributed to multiple network units. Some or all of the modules can be selected according to actual needs to achieve the purpose of the embodiment.

Furthermore, an embodiment of the present disclosure also provides a computer-readable storage medium storing computer-executable instructions which, when executed by a processor 1720 or controller, for example, the processor 1720 in any of the above-mentioned embodiments of the data processing device 1700, can cause the processor 1720 to perform the data processing method applied to the data processing device 1700 in any of the above embodiments, for example, to perform the above-described method steps S100A to S300A in FIG. 5, S100B to S200B in FIG. 6, S110A to S140A in FIG. 7, S150A to S180A in FIG. 8, S410 to S420 in FIG. 12, S510 to S540 in FIG. 13, S610 to S620 in FIG. 14, or S601 to S602 in FIG. 15. It can be understood by those having ordinary skill in the art that all or some of the steps of the methods and systems disclosed above may be implemented as software, firmware, hardware, and appropriate combinations thereof. Some or all of the physical components may be implemented as software executed by a processor, such as a central processing unit, a digital signal processor or a microprocessor, or as hardware, or as an integrated circuit, such as an application-specific integrated circuit. Such software may be distributed on computer-readable media, which may include computer-readable storage media (or non-transitory media) and communication media (or transitory media). As well known to those having ordinary skill in the art, the term computer-readable storage medium includes volatile and nonvolatile, removable and non-removable media implemented in any method or technique for storing information, such as computer-readable instructions, data structures, program modules or other data. A computer-readable storage medium includes but is not limited to RAM, ROM, EEPROM, flash memory or other memory technologies, CD ROM, digital versatile disk (DVD) or other optical disk storage, cassettes, magnetic tapes, magnetic disk storage or other magnetic storage apparatuses, or any other medium that can be configured to store desired information and can be accessed by a computer. Furthermore, it is well known to those having ordinary skill in the art that communication media typically contain computer-readable instructions, data structures, program modules or other data in a modulated data signal such as a carrier wave or other transmission mechanism, and may include any information transmission media.

According to the smart home control method and device and the storage medium provided by the embodiments of the present disclosure, the smart home device service provider sends the first operation request for the smart home device to the smart home control server, the smart home control server sends the first operation request to the control terminal for authentication, and after the authentication is passed, the smart home control server sends the first control instruction of the first operation request to the smart home console, receives the first operation result fed back by the smart home console and feeds back the first operation result to the smart home device service provider; that is, the smart home device service provider cannot directly operate the smart device, instead, the smart home device service provider needs to be authenticated by the control terminal and then operates the smart home device through the smart home control server and the smart home console, thus improving the data security of the smart home device; in addition, the control terminal needs operation authorization to control the smart home device, and then the control terminal can operate the smart home device through the smart home control server and the smart home console, thus further improving the data security of the smart home device; further, there is no direct interaction between the control terminal and the smart home device service provider, instead, the interaction between the control terminal and the smart home device service provider needs to be carried out through the smart home control server, which reduces the risk of the smart home device service provider collecting control terminal data.

The above is a detailed description of some implementations of the present disclosure, but the present disclosure is not limited to the above-mentioned embodiments. those having ordinary skill in the art can also make various equivalent modifications or replacements without departing from the principle of the present disclosure, and these equivalent modifications or replacements are all included in the scope defined by the claims of the present disclosure.

What is claimed is:

1. A smart home control method, performed by a smart home control server, comprising:

in response to receiving a first operation request initialized and sent by a smart home device service provider, sending verification information of the first operation request to a control terminal, such that the control terminal authenticates the verification information to obtain an authentication result and feeds back the authentication result;

receiving the authentication result fed back by the control terminal;

sending a first operation instruction of the first operation request to a smart home console in response to a positive authentication result, such that the smart home console to send the first operation instruction to the smart home device;

preventing the smart home device service provider from operating the smart home device in response to a negative authentication result;

receiving a first operation result sent by the smart home console, and sending the first operation result to the smart home device service provider, wherein the first operation result is obtained through execution of the first operation instruction by the smart home device;

in response to receiving a second operation instruction sent by the control terminal, sending the second operation instruction to the smart home console, such that the smart home console to send the second operation instruction to the smart home device;

receiving a second operation result sent by the smart home console; and sending the second operation result to the control terminal:

wherein the second operation result is obtained through execution of the second operation instruction by the smart home device; and wherein the smart home console communicates with the smart home device service provider and the control terminal via the smart home control server.

2. The method of claim 1, wherein data are transmitted between a smart home control server and the control terminal through a first data channel (DC) established by an IP Multimedia Subsystem (IMS), and the first DC is established by the following steps:

sending, by a first device, a first call request carrying DC information of the first device to the IMS;

accepting, by the IMS, the first call request, and forwarding, by the IMS, the first call request to a second device;

receiving, by the second device, the first call request, and sending, by the second device, a first call response carrying DC information of the second device to the IMS; and accepting, by the IMS, the first call response, and forwarding, by the IMS, the first call response to the first device, wherein the first device is one of the smart home control server and the control terminal, and the second device is the other one of the smart home control server and the control terminal.

3. The method of claim 1, wherein data are transmitted between a smart home control server and the smart home console through a second DC established by an IP Multimedia Subsystem (IMS), and the second DC is established by the following steps:

sending, by the smart home control server, a second call request carrying DC information of the smart home control server to the IMS;

accepting, by the IMS, the second call request, and forwarding, by the IMS, the second call request to the smart home console;

receiving, by the smart home console, the second call request, and sending, by the smart home console, a second call response carrying DC information of the smart home console to the IMS; and accepting, by the IMS, the second call response, and forwarding, by the IMS, the second call response to the smart home control server.

4. The method of claim 1, wherein the smart home control server stores a control program of the smart home device, such that the smart home console to load the control program of the smart home device from the smart home control server according to the first operation instruction or the second operation instruction.

5. The method of claim 4, wherein the control terminal stores a control program of the smart home console, and the second operation instruction is sent by the control program of the smart home console.

6. A smart home control serverdevice, comprising:

a memory, a processor, a program stored in the memory and executable by the processor, and a data bus for realizing connection and communication between the processor and the memory, wherein the program, when executed by the processor, implements the steps of the control method of claim 1.

7. The smart home control server of claim 6, wherein data are transmitted between a smart home control server and the control terminal through a first data channel (DC) established by an IP Multimedia Subsystem (IMS), and the first DC is established by the following steps:

sending, by a first device, a first call request carrying DC information of the first device to the IMS;

accepting, by the IMS, the first call request, and forwarding, by the IMS, the first call request to a second device;

receiving, by the second device, the first call request, and sending, by the second device, a first call response carrying DC information of the second device to the IMS; and accepting, by the IMS, the first call response, and forwarding, by the IMS, the first call response to the first device, wherein the first device is one of the smart home control server and the control terminal, and the second device is the other one of the smart home control server and the control terminal.

8. The smart home control server of claim 6, wherein data are transmitted between a smart home control server and the smart home console through a second DC established by an IP Multimedia Subsystem (IMS), and the second DC is established by the following steps:

sending, by the smart home control server, a second call request carrying DC information of the smart home control server to the IMS;

accepting, by the IMS, the second call request, and forwarding, by the IMS, the second call request to the smart home console;

receiving, by the smart home console, the second call request, and sending, by the smart home console, a second call response carrying DC information of the smart home console to the IMS; and accepting, by the IMS, the second call response, and forwarding, by the IMS, the second call response to the smart home control server.

9. The smart home control server of claim 6, wherein the smart home control server stores a control program of the smart home device, such that the smart home console to load the control program of the smart home device from the smart home control server according to the first operation instruction or the second operation instruction.

10. A non-transitory computer-readable storage medium storing one or more programs which, when executed by one or more processors, cause the processors to implement the steps of the control method of claim 1.

11. The non-transitory computer-readable storage medium of claim 10, wherein data are transmitted between a smart home control server and the control terminal through a first data channel (DC) established by an IP Multimedia Subsystem (IMS), and the first DC is established by the following steps:

sending, by a first device, a first call request carrying DC information of the first device to the IMS;

accepting, by the IMS, the first call request, and forwarding, by the IMS, the first call request to a second device;

receiving, by the second device, the first call request, and sending, by the second device, a first call response carrying DC information of the second device to the IMS; and accepting, by the IMS, the first call response, and forwarding, by the IMS, the first call response to the first device, wherein the first device is one of the smart home control server and the control terminal, and the second device is the other one of the smart home control server and the control terminal.

12. The non-transitory computer-readable storage medium of claim 10, wherein data are transmitted between a smart home control server and the smart home console through a second DC established by an IP Multimedia Subsystem (IMS), and the second DC is established by the following steps:

sending, by the smart home control server, a second call request carrying DC information of the smart home control server to the IMS;

accepting, by the IMS, the second call request, and forwarding, by the IMS, the second call request to the smart home console;

receiving, by the smart home console, the second call request, and sending, by the smart home console, a second call response carrying DC information of the smart home console to the IMS; and accepting, by the IMS, the second call response, and forwarding, by the IMS, the second call response to the smart home control server.

13. The non-transitory computer-readable storage medium of claim 10, wherein the smart home control server stores a control program of the smart home device, such that the smart home console to load the control program of the smart home device from the smart home control server according to the first operation instruction or the second operation instruction.

14. A smart home control method, performed by a smart home console, comprising:

receiving an operation instruction sent by a smart home control server;

sending the operation instruction to a smart home device;

receiving an operation result sent by the smart home device, wherein the operation result is obtained through execution of the operation instruction by the smart home device; and sending the operation result to the smart home control server, such that the smart home control server to feed back the operation result to a smart home device service provider or a control terminal;

wherein the control terminal is authorized to operate the smart home device, and configured to establish a first data channel (DC) with the smart home control server through an IP Multimedia Subsystem (IMS); and wherein the operation instruction comprises a first operation instruction sent by the smart home device service provider or a second operation instruction sent by the control terminal, and the first operation instruction is authenticated by the control terminal.

15. A smart home console, comprising:

a memory, a processor, a program stored in the memory and executable by the processor, and a data bus for realizing connection and communication between the processor and the memory, wherein the program, when executed by the processor, implements the steps of the control method of claim 14.

16. A non-transitory computer-readable storage medium storing one or more programs which, when executed by one or more processors, cause the processors to implement the steps of the control method of claim 14.

17. A smart home control method, performed by a control terminal authorized to operate a smart home device, comprising:

establishing a first data channel (DC) with a smart home control server through an IP Multimedia Subsystem (IMS);

receiving verification information of a first operation request forwarded by the smart home control server from a smart home device service provider through the first DC;

authenticating the verification information to obtain an authentication result;

feeding back the authentication result to the smart home control server through the first DC:

sending the second operation instruction to a smart home control server, such that the smart home control server sends the second operation instruction to a smart home console and receives a second operation result fed back by the smart home console; and receiving the second operation result fed back by the smart home control server;

wherein in response to a positive authentication result, a first operation instruction of the first operation request is sent to the smart home console, such that the smart home console sends the first operation instruction to the smart home device, and a first operation result obtained through execution of the first operation instruction by the smart home device is sent to the smart home device service provider, and in response to a negative authentication result, the smart home device service provider is prevented form operating the smart home device; and wherein the second operation result is obtained through execution of the second operation instruction by the smart home device.

18. The method of claim 17, wherein the authorization for operating the smart home device is obtained by the following steps:

sending an authorization application for the operation of the smart home device to the smart home control server, such that the smart home control server sends the authorization application to a smart home device service provider and receives an authorization result fed back by the smart home device service provider; and receiving the authorization result fed back by the smart home control server.

19. A control terminal authorized to operate a smart home device, comprising:

a memory, a processor, a program stored in the memory and executable by the processor, and a data bus for realizing connection and communication between the processor and the memory, wherein the program, when executed by the processor, implements the steps of the control method of claim 17.

20. A non-transitory computer-readable storage medium storing one or more programs which, when executed by one or more processors, cause the processors to implement the steps of the control method of claim 17.

* * * * *